Jan. 16, 1940.  S. KARASICK  2,187,240

PERMANENT MAGNET CHUCK AND DEMAGNETIZER

Filed Jan. 16, 1937  2 Sheets-Sheet 1

INVENTOR
SAMUEL KARASICK
BY D. Clyde Jones
ATTORNEY

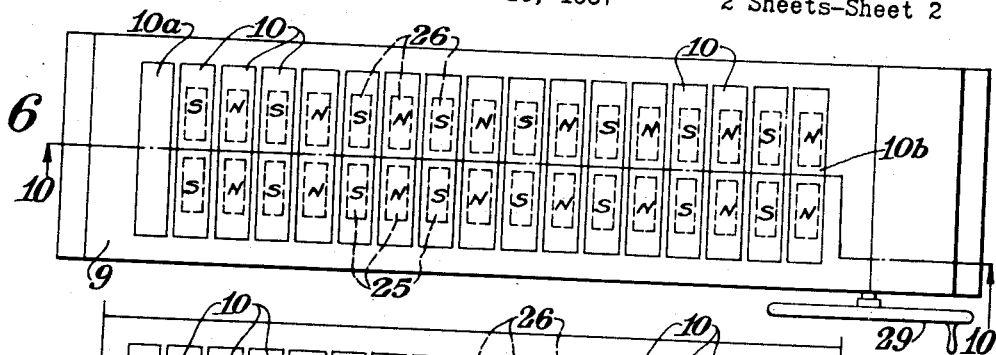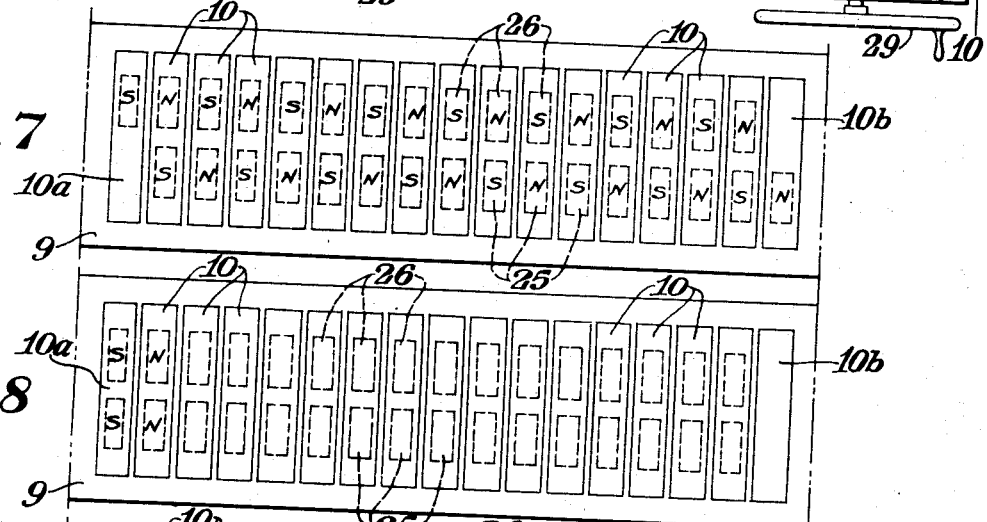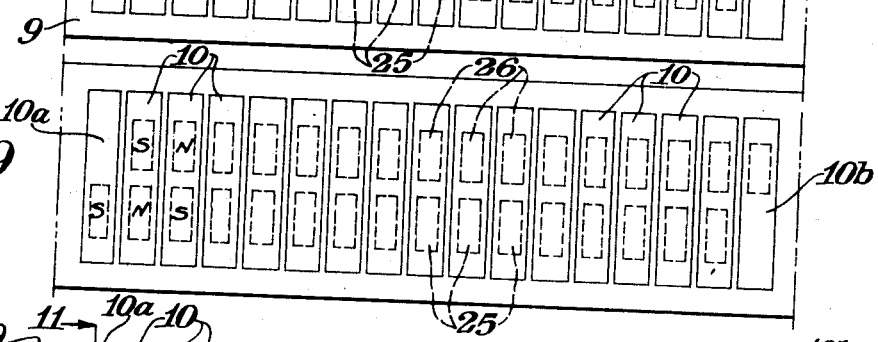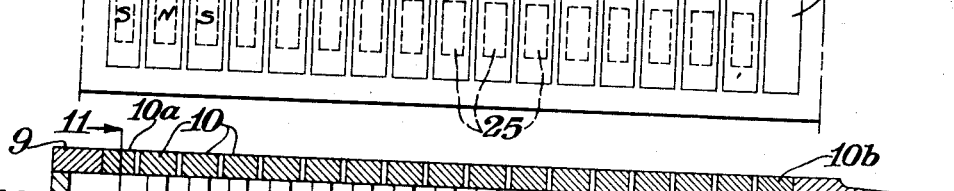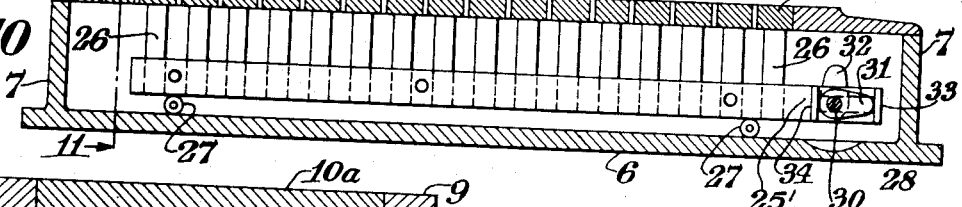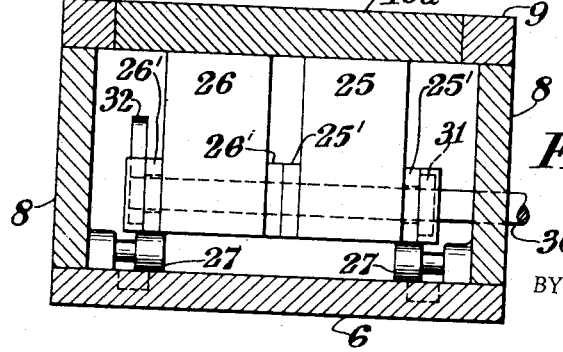

Patented Jan. 16, 1940

2,187,240

UNITED STATES PATENT OFFICE 2,187,240

PERMANENT MAGNET CHUCK AND DEMAGNETIZER

Samuel Karasick, Mount Vernon, N. Y.

Application January 16, 1937, Serial No. 120,978

17 Claims. (Cl. 175—367)

This invention relates to magnetic chucks and more particularly to a combined magnetic chuck and demagnetizer.

It has been proposed in a magnetic chuck to utilize permanent magnets to attract and hold ferrous work material. By such a construction it is possible to dispense with the electromagnets and the energizing current source therefor, as used in former devices. However, such permanent-magnet chucks have left hardened steel parts of work material permanently magnetized, so that it was necessary to subject such parts to the action of a separate demagnetizer.

In accordance with the present invention a magnetic chuck of the permanent magnetic type is so arranged that ferrous work material can not only be held on the chuck and released therefrom at will but can also be demagnetized while still supported thereon.

Furthermore, even where complete demagnetization is not required, hardened steel work will adhere so tightly to the chuck, even when the normal flux is shunted to a negligible value, that great effort is required on the part of the operator to effect the removal of such work. However, in accordance with a further feature of this invention the magnetic poles of the chuck are shiftable with respect to the pole pieces thereof to cause reversals of flux whereby partial demagnetization of the work material in the chuck is effected, sufficient to greatly facilitate the removal of hardened steel parts from the work support of such a chuck.

Figure 1:
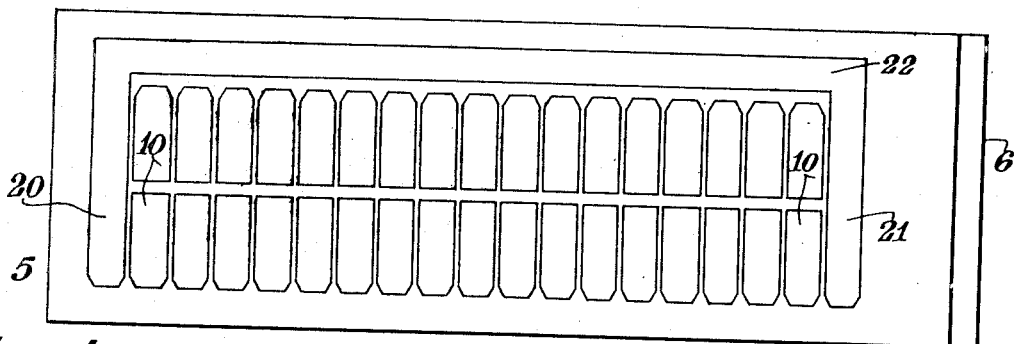
Figure 2:
Figure 3:
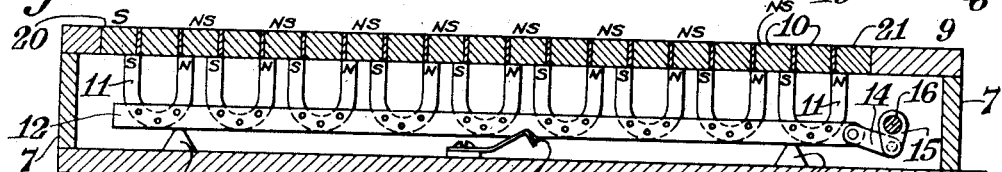
Figure 4:
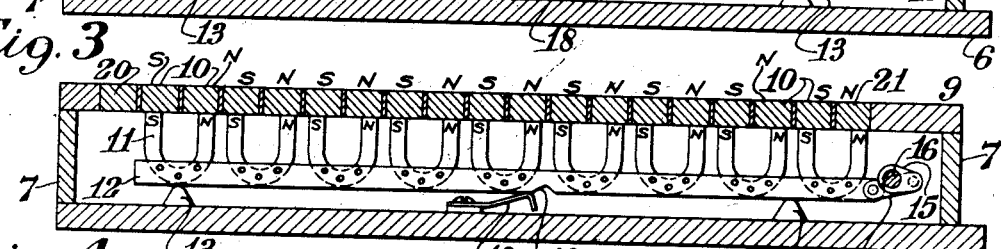
Figure 5:
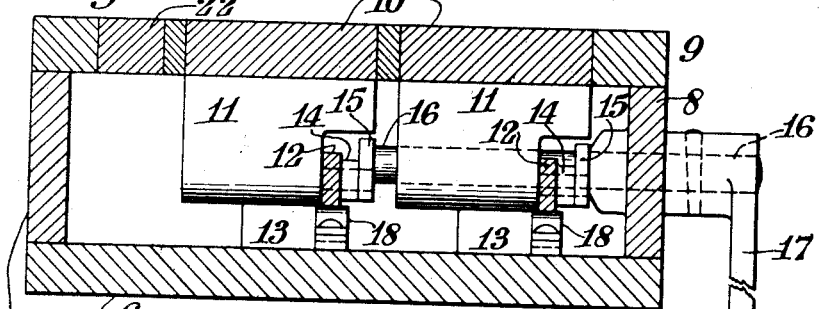

The various features and advantages of the invention will appear from the detailed description and claims when taken with the drawings in which Fig. 1 is a plan view of the combined chuck and demagnetizer of the present invention; Figs. 2, 3 and 4 are vertical longitudinal sections therethrough, Fig. 2 showing the chuck in its holding position in which ferrous work parts are held thereon, Fig. 3 illustrating the chuck in its "off" position for releasing the work parts, and Fig. 4 disclosing the chuck in one of its alternate positions for demagnetizing such work parts; and Fig. 5 is a vertical transverse section of the chuck taken on the line 5—5 of Fig. 2; Fig. 6 is a plan view of a modified form of the chuck of this invention; Figs. 7, 8 and 9 are partial views of this modified chuck showing in dotted lines the alternate positions of the magnetic poles thereof; Fig. 10 is a longitudinal section of the chuck taken on the line 10—10 of Fig. 6 and Fig. 11 is a transverse section through the chuck.

In the drawings, the numeral 5 generally designates the combined chuck and demagnetizer of this invention. This chuck comprises a casing of non-magnetic material having a bottom 6, end walls 7 and side walls 8. The top of the casing is closed by a work supporting plate 9 of non-magnetic material having two spaced series of pole pieces 10 which are separated from each other and are cast or otherwise supported therein in spaced relation. These pole-pieces are preferably made of a ferrous material which has high permeability. Within the casing there are provided two slidable series of permanent magnets 11, preferably formed of an aluminum-nickel-iron alloy now sold under the trade name "Alnico", altho any material which provides a magnet of high coercive force and high residual induction, may be used. The permanent magnets of each series altho they may be made in various forms are herein shown as simple horse-shoe magnets which are mounted on a slidable bar 12 with their free ends or poles in a position to contact the under surface of the pole pieces 10. The dimensions and arrangement of the poles of these magnets with respect to the pole pieces 10 are such that in the holding position of the chuck as shown in Fig. 2 each magnet except the first in each series (reading from left to right) has its north and south poles engaging a pair of adjacent pole pieces with the "north" and "south" poles of the magnets alternately arranged so that the pole pieces are alternately "north" and "south" as viewed in Fig. 2. The magnets are also movable to a "release" position as shown in Fig. 3 wherein the north and south poles of adjacent magnets are bridged together through a single related pole-piece. The magnetic poles of the permanent magnet at each end of the magnet system are of opposite polarity, and in the "release" position (Fig. 3) these poles engage the pole pieces 20, 21, which are connected by the magnetic shunt bar 22 integral therewith. The pole pieces 20, 21, and the bar 22 are made of highly permeable material, such as soft iron, and form a low reluctance path whereby substantially all magnetic flux from the permanent magnet system is effectively diverted from work pieces held on the chuck.

The magnets are also movable to an alternate position shown in Fig. 4 wherein the polarity of the pole pieces is reversed from that illustrated in Fig. 2, that is, the pole-pieces which were "north" are now "south" and the "south" poles are now "north". It will be understood that hardened steel parts can be demagnetized on the chuck by repeatedly moving the magnets back and forth between positions shown in Figs. 2 and 4 while slowly removing the work from the chuck, lengthwise of the pole pieces.

Altho any suitable arrangement may be employed for sliding the two series of magnets to any of the three positions illustrated in Figs. 2, 3 and 4, the arrangement herein disclosed is satisfactory for this purpose. In this arrangement the respective series of magnets are mounted for horizontal movement being attached to bars 12 which slide on suitable guides 13 provided on the bottom of the casing. Two sliding bars 12 respectively attached to the two series of magnets have their right hand ends connected by links 14 to crank arms 15 which are mounted on the rotatable shaft 16. A crank handle 17 secured on the shaft, serves to rock it to its various positions.

As herein illustrated the sliding bars 12 may be retained in their intermediate or release position by springs 18 carried by the casing and engaging notches 19 in these bars.

In the operation of the chuck one or more ferrous work pieces to be supported thereon are placed on the top plate 9 so that they bridge several of the pole pieces 10 while the permanent magnets are in the position illustrated in Fig. 2. When it is desired to "dechuck" or release the work piece, if it is of such material that it does not retain any substantial amount of magnetism, the crank handle 17 is rocked until the springs 18 engage the notches 19 in the bars 12, at which time the north and south poles of adjacent magnets are in engagement with a single pole-piece as shown in Fig. 3, so that the flux from the permanent magnets will be substantially diverted through certain of the pole pieces, instead of passing through the work material.

However, if the material of the work piece has such characteristics, that it retains its permanent magnetism, as is the case with hardened steel, it is necessary to demagnetize this piece. This is effected by repeatedly rocking the crank handle so that the permanent magnets are alternately moved between the positions which they occupy in Fig. 4 to the positions which they occupy in Fig. 2, thereby repeatedly reversing the flux through said piece. During this movement of the two series of magnets, the work material is preferably slowly withdrawn crosswise of the chuck, that is lengthwise of the pole-pieces.

In the modified chuck illustrated in Figs. 6 to 11 inclusive, the casing is similar to that described above and its parts are designated by the same reference characters. The top of the casing is closed by a top plate 9 having pole pieces 10 of highly permeable material embedded in non-magnetic and/or non-conducting material so that these pieces are exposed at the top and bottom of the plate, the exposed surfaces thereof being machined smooth. There are mounted for independent movement longitudinally of the casing, two series of permanent magnets 25 and 26 which are arranged to contact, in each of their several positions of adjustment, the under surfaces of certain of the several pole pieces 10. These permanent magnets 25 and 26 are of the bar type and are clamped between the strips 25' 25' and 26' 26'. These strips with the permanent bar magnets clamped therebetween are arranged to slide longitudinally of the casing in either direction by a distance equal to the width of a pole piece and the non-magnetic material between two adjacent pole pieces. Rollers 27 mounted on the casing facilitate the movement of the two series of magnets.

These magnets are shiftable from their holding position (Fig. 6) in which pole piece 10a is inactive, to their three alternate positions respectively illustrated in Figs. 7, 8 and 9. In Fig. 7, it will be noted that the magnets 26 have been shifted to the left while in Fig. 8 the magnets 25 have been shifted to the left to bring them into step with the magnets 26. In this last position pole piece 10b is inactive. In the next position shown in Fig. 9, the magnets 26 have been shifted to the right so that the two series are again out of step. In the next stage of the demagnetizing operation magnets 25 are shifted to the right to bring the two groups into step as illustrated in Fig. 6.

The alternate shifting of the two series of magnets 25 and 26 to the positions illustrated can be effected in the manner shown in Figs. 10 and 11. This mechanism includes a shaft 30 rotatably mounted in the casing adjacent the right end thereof as illustrated in Fig. 10. One end of this shaft projects at the front of the casing and is provided with a hand wheel 29 by which the shaft can be rotated. This shaft is also provided with two cams 31 and 32 which are displaced 90 degrees apart with respect to each other to slide the two series of magnets alternately. The cam 31 is adapted to rotate in a cam way provided by the spaced bars 33 and 34, each having one end secured to the outer clamping strip 25', so that the rotation of the cam 31 shifts the series of magnets 25 from the position shown in Figs. 6 and 7 to the position shown in Figs. 8 and 9 and on further rotation of the cam shifts this group of magnets to the position shown in Figs. 6 and 7. The cam 32 also rotates in a cam way provided by similar spaced bars 33 and 34 each having one end secured to the outer clamping strip 26', to similarly shift the series of magnet 26 to the various positions shown in Figs. 6 to 9 inclusive.

In the operation of the chuck, if it is desired to retain a magnetic work piece thereon, the two series of magnets 25 and 26 are shifted to the position shown in Fig. 6. When however, it is desired to demagnetize the work piece, the hand wheel 29 rotates the shaft 30 to shift the magnets 25 and 26 repeatedly to the positions shown in Figs. 6, 7, 8 and 9. Thus by rotating the shaft 30 through ninety degrees, the chuck may be changed from a condition in which flux issues from all of the pole pieces but one in the work holding surface to a condition in which all pole pieces but two have the flux therethrough neutralized and diverted from the work holding surface. A further rotation of the shaft 30 through an additional ninety degrees will reenergize the pole pieces in the work holding support but with reversing polarity. Thus, an alternating flux can be produced in certain of the pole pieces by continuous rotation of the shaft 30 by means of its hand wheel. This enables the operator of the chuck to demagnetize a work piece held thereon by removing said piece from the chuck in a sliding motion across the short dimension of the chuck, that is parallel to the length of the pole pieces while the rotation of the shaft 30 is continued.

The present disclosure is merely typical of applicant's invention and it will be understood that there can be many variations and modifications thereof, within the scope of the appended claims.

without departing from the spirit of the invention.

What I claim is:

1. A combined magnetic chuck and demagnetizer comprising a work support of nonmagnetic material having a series of pole-pieces of permeable material mounted therein, a series of permanent magnets having poles of opposite polarity at one surface of said support, each of said poles being substantially in contact with one of said pole pieces, and means operable for moving said poles to reverse the positions of said poles with respect to said pole pieces whereby a pole of opposite polarity can be substituted for the pole of a given polarity which originally contacted a given pole piece.

2. A combined magnetic chuck and demagnetizer comprising a work support of nonmagnetic material having a series of pole pieces of permeable material mounted therein, a plurality of permanent magnets having poles of opposite polarity at one surface of said support, each of said poles being substantially in contact with said pole pieces, and means operable for moving said poles to reverse the positions of said poles with respect to said pole pieces whereby a pole of opposite polarity can be substituted for the pole of a given polarity which originally contacted a given pole piece, said means being also operable to position adjacent magnets with poles thereof of opposite polarity in contact with a pole piece whereby the north and south poles of a plurality of magnets are linked together magnetically by a plurality of pole pieces.

3. A combined magnetic chuck and demagnetizer comprising a work support of nonmagnetic material having a plurality of fixed pole pieces of permeable material mounted therein, a plurality of permanent magnets having poles of opposite polarity at one surface of said support and substantially in contact with said pole pieces, and means operable to reverse the positions of said poles with respect to said pole pieces whereby a pole of opposite polarity can be substituted for the pole of a given polarity which originally contacted a given pole piece, said means being also operable to position said magnets with respect to said pole pieces to divert substantially all of the flux of said magnets through certain of said pole pieces.

4. A combined chuck and demagnetizer, including a work support, a plurality of magnetizable work holding pole pieces terminating in a complex pattern in a work-supporting surface of said support, means including said pole pieces and permanent magnets in operative relation thereto for holding magnetizable work pieces on said surface whereby a flux pattern corresponding to said complex pattern is developed in said work pieces, and means for repeatedly moving opposite poles of said magnets into engagement with said pole pieces to reverse the flux therethrough whereby the work pieces are deenergized in the same flux pattern that magnetized them as the work is withdrawn from the support.

5. In a magnetic device, a work support, a plurality of magnetizable work holding pole pieces terminating in a complex pattern in a work supporting surface of said support, means including movable permanent magnets to magnetize said pole pieces for holding magnetizable work material on said surface whereby a flux pattern corresponding to said complex pattern is developed in said work material, and means repeatedly to reverse the position of said magnets with respect to said pole pieces for demagnetizing the work material in the same flux pattern that magnetized them.

6. In a magnetic device, a work support, a plurality of magnetizable work holding pole pieces terminating in a complex pattern in a work-supporting surface of said support, means including movable permanent magnets to magnetize said pole pieces unidirectionally to grip pieces of material against said surface, whereby a flux pattern corresponding to said complex pattern is developed in ferrous work material held on said support, and means repeatedly and reversingly to displace said permanent magnets with respect to said pole pieces to reverse the magnetization of said pole pieces in said complex pattern and to a degree effective for demagnetizing said work pieces.

7. In a magnetic device of the class described, a work holding support having a plurality of pole pieces mounted in non-magnetic material in said support, a bar of low reluctance material connecting two of the ends of a pair of pole pieces remotely spaced from each other, a plurality of movable permanent magnets having their poles in engagement with certain of said pole pieces to energize them, and means for moving said magnets to position the poles thereof in engagement with certain of said pole pieces to complete a path of low reluctance from said poles through said last-mentioned pole pieces and through said bar.

8. In a magnetic device of the class described, a work holding support having a series of pole pieces mounted in non-magnetic material in said support, a bar of low reluctance material connecting two of the ends of the pole pieces at each end of said series, a plurality of movable permanent magnets having their poles in engagement with certain of said pole pieces to energize them, and means for moving said magnets to position the poles thereof in engagement with certain of said pole pieces to complete a path of low reluctance from said poles through said last-mentioned pole pieces and through said bar.

9. A combined magnetic chuck and demagnetizer comprising a work support of non-magnetic material having a plurality of pole pieces of permeable material mounted therein, two series of permanent magnets having poles of opposite polarity at one surface of said support and in contact with said pole pieces, and means for shifting the two series of magnets to bring two poles thereof of like polarity into contact with each of said pole pieces to retain a work piece thereon and for shifting the two series of magnets with respect to each other to bring alternately two like poles and two unlike poles, one from each series, into contact with each pole piece to demagnetize said work piece thereon.

10. A combined magnetic chuck and demagnetizer comprising a work support of non-magnetic material having a plurality of pole pieces of permeable material mounted therein, two series of permanent magnets having poles of opposite polarity at one surface of said support and in contact with said pole pieces and means for displacing both series of magnets with respect to each other and with respect to said pole pieces alternately to bring like poles and unlike poles, one from a magnet of each series, into engagement with a given pole piece.

11. A combined magnetic chuck and demagnetizer comprising a work support of non-magnetic material having a plurality of pole pieces of permeable material mounted therein, two series of permanent magnets having poles of opposite polarity at one surface of said support and in contact with said pole pieces, and means for displacing both of said series of magnets with respect to said pole pieces to repeatedly reverse the polarity of each of certain of said pole pieces.

12. A combined magnetic chuck and demagnetizer comprising a work support of non-magnetic material having a plurality of pole pieces of permeable material mounted therein, two series of permanent magnets having poles of opposite polarity at one surface of said support and substantially in contact with said pole pieces, and means for reciprocating both of said series of magnets with respect to said pole pieces in a cycle to successively energize said pole pieces by passing flux therethrough, to neutralize the flux in said pole pieces, to reverse the direction of the original flux through said pole pieces then to neutralize the flux in said pole pieces and then to energize said pole pieces by flux therethrough in the original direction.

13. A combined magnetic chuck and demagnetizer comprising a work support of non-magnetic material having a series of pole pieces of permeable material mounted therein, a series of permanent magnets having poles of opposite polarity at one surface of said support, each of said poles being substantially in contact with one of said pole pieces, and means for reciprocally moving said poles to reverse the position of said poles with respect to said pole pieces whereby a pole of opposite polarity and a pole of given polarity are alternately disposed beneath a given pole piece.

14. A combined magnetic chuck and demagnetizer comprising a work support of non-magnetic material having a series of pole pieces of permeable material mounted therein, a series of permanent magnets having poles of opposite polarity at one surface of said support, each of said poles being substantially in contact with one of said pole pieces, and manually operable means for reciprocally moving said poles to reverse the position of said poles with respect to said pole pieces whereby a pole of opposite polarity and a pole of given polarity are alternately disposed beneath a given pole piece.

15. In a combined magnetic chuck and demagnetizer, a part including non-magnetic material having a series of pole pieces of permeable material mounted therein and provided with a work-holding surface, magnetic means including permanent magnets in operative relation to said pole pieces for producing flux in portions of said work-holding surface, the flux in adjacent portions of said work surface being of opposite polarity, and mechanism for reciprocating said magnetic means in a rectilinear path substantially parallel to said work-holding surface to repeatedly and completely reverse the said flux produced in said work-holding surface.

16. In a combined magnetic chuck and demagnetizer, a part including non-magnetic material having a series of pole pieces of permeable material mounted therein and provided with a work-holding surface, means comprising magnets in operative relation to said pole pieces and disposed in alternate polar relation for establishing flux therethrough of corresponding alternate polarity, a substantial number of said magnets being permanent magnets, and mechanism for reciprocating said means in a rectilinear path parallel to said work-holding surface to repeatedly reverse the polarity of the flux established in said pole pieces.

17. In a combined magnetic chuck and demagnetizer, a part including non-magnetic material having a series of uniformly spaced pole pieces of permeable material mounted therein and provided with a work-holding surface, means comprising magnets in operative relation to said pole pieces and disposed in alternate polar relation for establishing flux therethrough of corresponding alternate polarity, a substantial number of said magnets being permanent magnets, and mechanism for reciprocating said means in a rectilinear path parallel to said work-holding surface to repeatedly reverse the polarity of the flux established in said pole pieces, the length of travel of said means in said path being substantially equal to the distance between the centers of adjacent pole pieces.

SAMUEL KARASICK.